Oct. 9, 1934.  J. R. McGIFFERT ET AL  1,976,406
SAFETY BRAKE
Filed Feb. 15, 1932   2 Sheets-Sheet 1

Inventor
John R. McGiffert
Ola L. Berby
By Howard Riche
Attorney

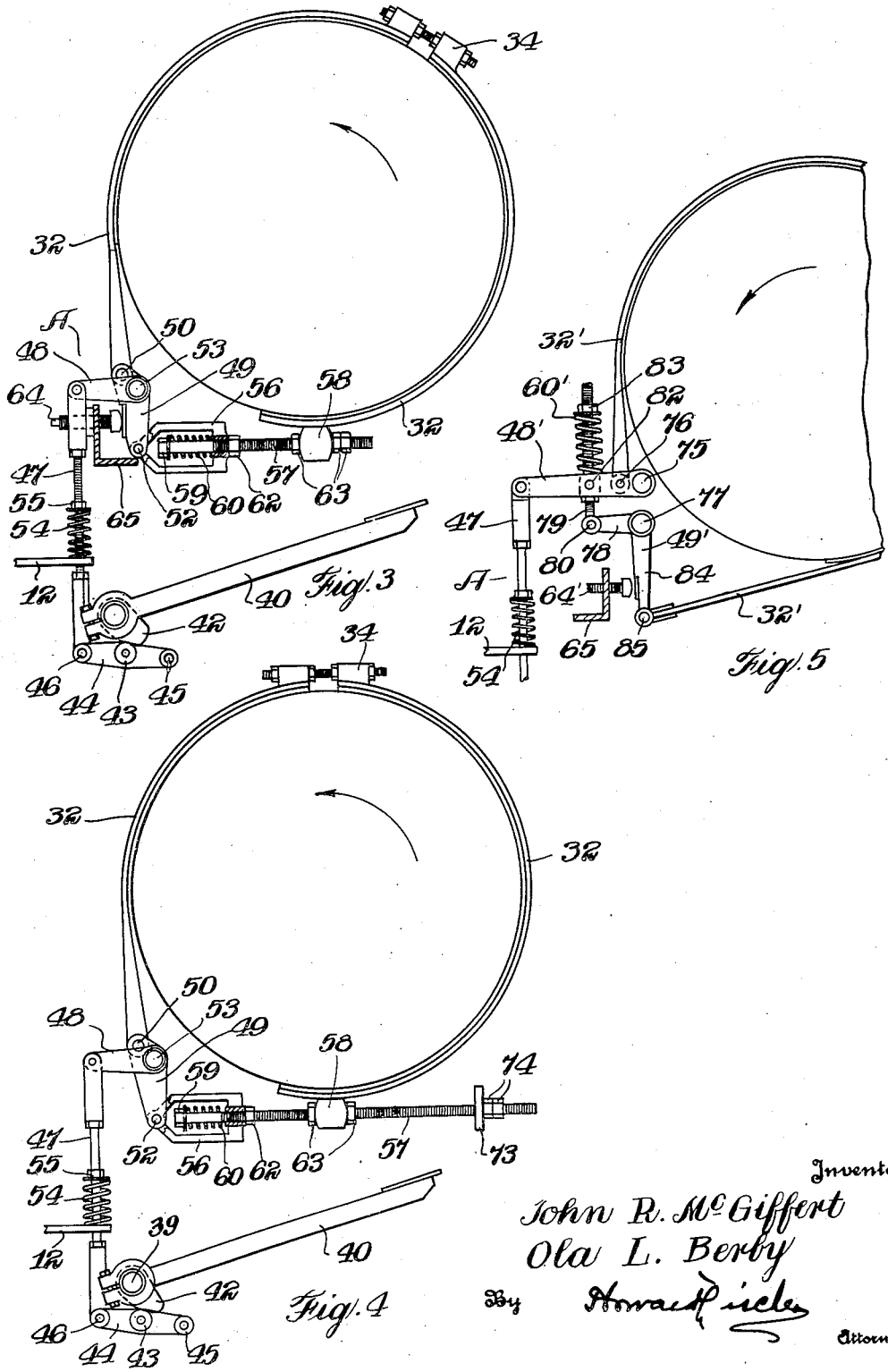

Patented Oct. 9, 1934

1,976,406

UNITED STATES PATENT OFFICE 1,976,406

SAFETY BRAKE

John R. McGiffert and Ola L. Berby, Duluth, Minn., assignors to Clyde Iron Works, Duluth, Minn., a corporation of Maine Application February 15, 1932, Serial No. 592,868

11 Claims. (Cl. 188—82)

This invention relates to safety brakes which may be used for hoisting mechanism to provide a safety appliance therefor, or for other similar means where it is desirable to provide a safety braking means with a differential brake, such as is used on hoisting mechanisms.

A feature resides in providing a safety brake with cushioning means, whereby any shock of the braking means, when suddenly applied, or applied in a manner to engage the drum or the rotating member to brake the same, will be absorbed in the cushioning means, rather than directing the shock of the braking to a hoisting or supporting cable or to the other mechanism where this safety brake is applied.

This safety brake includes means for applying a brake to a brake drum or to other braking means, in the case of an emergency, where, should the operator release the lever which operates the regular braking means for the drum and which may also control the safety brake, then this safety brake means is automatically applied and the cushioning means incorporated therein will absorb the shock or force which would be ordinarily directed to the member being engaged by the safety brake. Therefore, with this safety brake means, even if the operator was careless and released the control lever, the safety brake would be automatically applied without damage or danger, or should the operator suddenly die, the safety brake would be applied without undue strain upon the operating parts including the cable, brake drum and mechanism.

In hoisting mechanisms, the cable which operates the elevator carriage or which is operated to raise and lower loads is wound upon the operating spool or spools and a brake is provided which engages against the brake drum for holding the spool in a set position or in braking the same in the operation of the hoisting mechanism. This safety brake means is applicable to the spool or spools of the hoisting mechanism, and may be operated by the same lever which controls the regular brake for stopping the spool. When this safety brake means is applied to a hoisting mechanism and the same lever which controls the regular brake operates the safety brake means, we provide a means for causing the safety brake to automatically engage upon the release of the lever which operates the regular brake, so that if this lever is accidentally released into normal position or is released into this position in the operation of the hoisting mechanism by the operator, the safety brake mechanism will come into operation simultaneously with the movement of the operating lever into normal position or when it is accidentally released into normal position.

Thus, we provide a means of safety for the hoisting mechanism or other mechanism where this safety means is applied, which with its cushioning means provides a very desirable safety braking means for hoisting mechanisms or other similar devices, where a safety brake is desirable. It is of primary importance to provide a cushioning means which acts to absorb sudden shock or grabbing of the safety brake and which co-operates to overcome the detrimental features of braking means where braking strains are suddenly applied. With this safety brake means, undesirable shocks and strains are relieved from the operating parts, making the same more safe to protect lives and overcoming undue wear on the operating parts.

This safety brake means when applied to a hoisting mechanism, overcomes accidental dropping of the suspended load and provides a means wherein the safety brake operates instantly with the releasing of the manual controlling lever which operates the regular brake for the hoist and provides that added feature of cushioning the application of the safety brake to give a more desirable braking means for hoists and other mechanism, where a brake of this character is desired.

These features, together with other details, objects, and applications of the safety brake means will be more fully and clearly set forth throughout the specification and claims.

In the drawings forming a part of this specification:

Figure 3 is a diagrammatic side view of the safety brake mechanism shown in Figures 1 and 2.

Figure 4 is a diagrammatic side view of a detail showing another form of the safety brake mechanism.

Figure 5 is a side view of still another form of the safety brake means showing a detail thereof.

Figure 1:
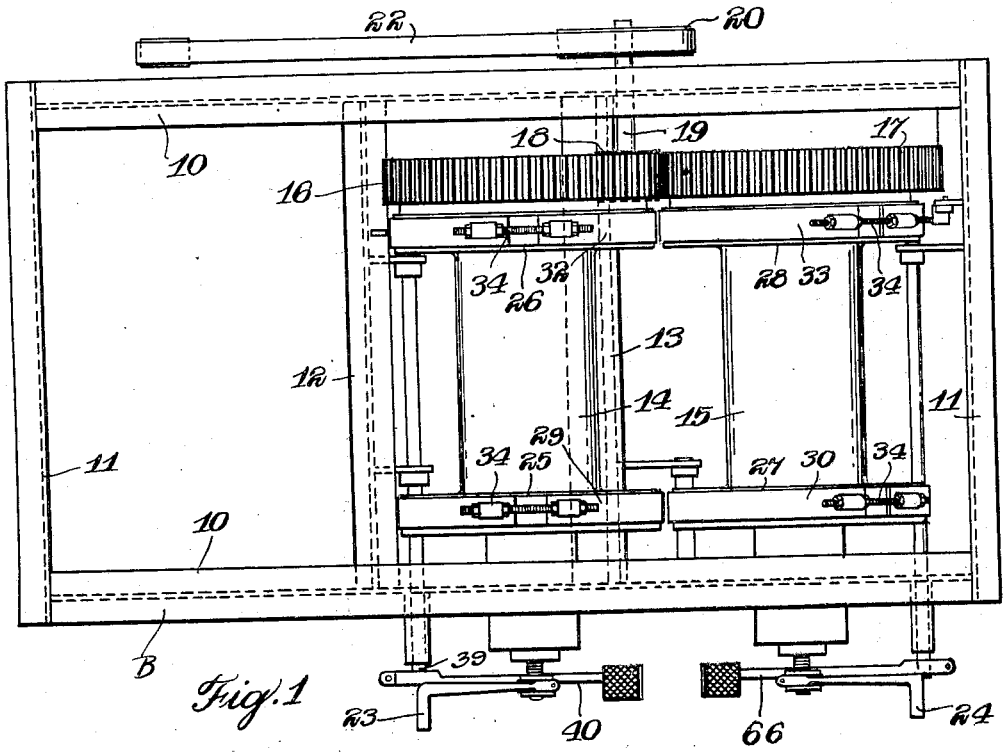
Figure 1 is a plan view of a hoisting mechanism showing a pair of operating spools for cables with my safety brake means applied thereto.

In the drawings, we have illustrated the safety brake A as applied to a hoisting mechanism B. The hoisting mechanism B is mounted upon a frame consisting of side frame members 10, end frame members 11 and cross supports 12 and 13. Winding spools 14 and 15 are supported on the frame of the hoisting mechanism B in a manner which is not disclosed in the drawings, but which is common in the art. Gear wheels 16 and 17 are mounted co-axially with the spools 14 and 15 respectively. Each of the gear wheels 16 and 17 is in engagement with a pinion 18, mounted upon the shaft 19 of the pulley 20. The pulley 20 is driven through the flexible driving means 22. The winding spools 14 and 15 are driven by the gear wheels 16 and 17, when the levers 23 and 24 respectively are rotated. Rotation of the handle levers 23 and 24 acts through thrust screws to bring the ends of the spools 14 and 15 adjacent the gear wheels 16 and 17 in contact with friction blocks carried by these gear wheels. This construction is common in the art and the details of construction have not been illustrated in the drawings.

Each of the spools 14 and 15 is provided with a brake drum upon either side thereof. The spool 14 is provided with a brake drum 25 which acts as a service brake drum and a drum 26 which acts as the safety brake drum. The spool 15 is provided in a similar manner with a drum 27 which acts as a service brake drum and a drum 28 which acts as the safety brake drum. Brake bands 29 and 30 are provided for the service brake drums 25 and 27 and brake bands 32 and 33 are provided for the safety brake drums 26 and 28. Each of the various brake bands is preferably formed in two parts with an adjusting means 34 interposed between these two parts.

Figure 2:
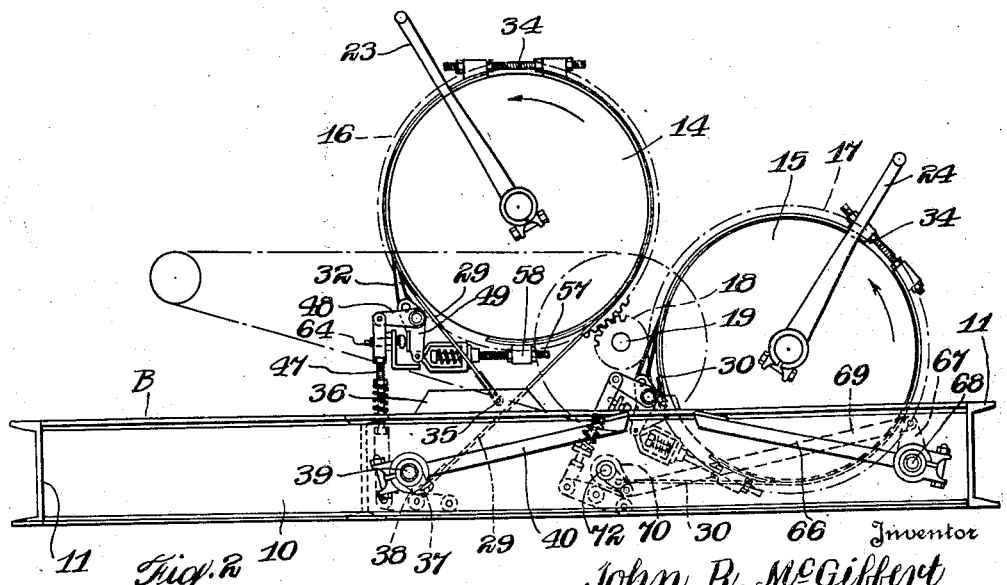
Figure 2 is a side elevation of the hoisting mechanism illustrated in Figure 1.

As may be seen in Figure 2 of the drawings, the brake band 29 of the spool 14 is pivotally secured at one end at 35 to a plate 36 which is rigidly secured to the frame of the hoisting mechanism B. The other end of the service brake band 29 is pivotally secured at 37 to the arm 38 mounted for rotation therewith. The foot lever 40 is also clamped upon the shaft 39 and acts to rotate this shaft when the foot lever 40 is depressed. It may be seen that a downward pressure upon the foot lever 40 will act to rotate the arm 38 in a clockwise direction, tightening the service brake band 29 upon the drum 25. As the various brake bands are suitably lined with a brake lining material, the speed of rotation of the spool 14 may be regulated by the foot lever 40.

A cam 42 is secured upon the shaft 39 at right angles thereto. The cam 42 is adapted to bear against the roller 43 on the arm 44. The arm 44 is pivoted at 45 and is pivotally connected at its opposite end 46 to the adjustable connecting member 47, which is adapted to connect the arm 44 with the arm 48.

The brake band 32 of the safety brake drum 26 is pivotally connected at each end to a bell crank member 49. One end of the brake band 32 toward which the drum rotates in the direction of the arrow as the cable is being wound upon the spool 14, is connected to the bell crank 49 by means of a removable pin 50. The other end of the brake band 32 is connected by the pin 52 to the longer arm of the bell crank 49. The bell crank 49 is free to pivot at 53 and the bell crank 49 is so designed that when one end thereof holds one end of the band 32 more closely about the drum 26, the other end of the band 32 is released somewhat. Owing to the difference in length of the arms of the bell crank, however, when the bell crank 49 acts to release the end of the band connected by the pin 50 a slight amount, the end of the band connected by the pin 52 is tightened a much greater amount. In a similar manner, when the bell crank 49 acts to tighten the end of the band 32 connected by the pin 50 about the drum 26, the other end of the band is released a much greater amount.

The adjustable connecting arm 47 extends through the top of the cross member 12 or through a fixed plate on the frame of the hoisting mechanism B. A compression spring 54 is interposed between this fixed plate and a nut 55 adjustably positioned on the connecting arm 47. The spring 54 acts to rotate the bell crank 49 about its axis 53 in a clockwise direction. By means of this compression spring 54, the band 32 is held into contact with the drum 26 when all pressure is removed from the foot lever 40.

A resilient connecting means is interposed between the pin 52 and the end of the brake band 32. A stirrup 56 is pivotally secured by the pin 52. A bolt 57 extends through the lug 58 on the band 32 and extends slidably through a hole in the base of the stirrup 56. Between the head 59 of the bolt 57 and the base of the stirrup 56, is interposed a compression spring 60. The initial tension of the compression spring 60 is regulated by means of an adjusting nut 62. The bolt 57 is secured in adjusted position to the lug 58 by means of a nut 63. The clockwise rotation of the bell crank 49 is limited by means of a screw stop 64 extending through a fixed cross member 65 secured to the frame of the hoisting mechanism B.

In the operation of the hoist, if no downward pressure is exerted upon the lever 40, the compression spring 54 will cause the brake band 32 to contact slightly with the brake drum 26 by rotating the bell crank 49 in a clockwise direction. It is obvious that a clockwise rotation of the bell crank 49 will tend to tighten that end of the band 32 connected to the lug 58 a much greater distance than will the end of the band connected to the pin 50 be released, causing a resultant tightening of the band 32. If the spool 14 is rotated in the direction of the arrow or in an anti-clockwise direction, as will be the case when the load is being lifted, the bell crank 49 will be pivoted in an anti-clockwise direction by the action of the brake band 32 dragging upon the brake drum 26. Turning the bell crank 49 in an anti-clockwise direction acts to release the band 32 and to permit the drum to rotate freely while the load is being lifted. As soon as the spool 14 begins to rotate in a clockwise direction, however, the brake band 32 will pull on the pin 50, acting to rotate the bell crank 49 in a clockwise direction. Due to the differential action of the bell crank, the brake band 32 will be tightened about the drum 26, preventing the rotation of the spool 14.

In the operation of the hoisting mechanism B, when the foot lever 40 is depressed, the cam 42 will bear against the roller 43 on the arm 44, acting through the connecting link or arm 47 to turn the bell crank 49 in an anti-clockwise direction. It is thus obvious that the depressing of the foot pedal 40 acts to release the safety brake A. The foot lever 40, however, acts to rotate the arm 38 which is connected to the movable end of the service brake 29. Therefore, the more the foot lever 40 is depressed, the more the service brake will be tightened about the drum 25. A slight downward movement of the foot lever 40 acts to release the safety brake A and as this movement is not sufficient to tighten the service brake 29, the spool 14 may revolve freely in either direction.

The resilient connection between the pin 52 and the lug 58 on the end of the brake band 32 is for the purpose of preventing too quick action of the safety brake A. When a heavy load is being dropped at the time the safety brake engages the brake drum 26, the strain upon the hoisting mechanism, due both to the weight of the load and to the acceleration of the same, might be sufficient to overload some portion of the mechanism to the breaking point. The resilient connection between the bell crank 49 and the lug 58 acts to obviate any danger of such an occurrence.

The compression spring 60 within the stirrup 56 is given an initial compression by the nut 62, which is sufficient to hold the maximum dead load for which the hoist is designed. When a strain greater than this maximum dead weight is exerted upon the hoisting cable, the spring 60 will compress to a greater extent. The maximum distance to which the spring 60 may compress, is limited by the screw stop 64 which acts against one arm of the bell crank 49. When the bell crank 49 is bearing against the screw stop 64, the end of the brake band 32 connected to the pin 50 becomes fixed and the maximum action of the brake is limited by the tension of the spring 60. An extremely heavy load will therefore not come to a stop with a jerk, as the maximum action of the brake is limited by the compression of the spring 60. The stop 64 is set properly so that sufficient compression may be obtained in the spring 60 to gradually overcome the force of the descending load and the acceleration thereof.

Figure 2 illustrates two spools 14 and 15, each of which are provided with a service brake and a safety brake. While these brakes for use with the spool 15 are arranged somewhat differently from the arrangement of parts used for operating the brakes for the spool 14, these brakes operate in a similar manner. When the foot lever 66 is depressed, the arm 67 secured on the shaft 68 of this lever will be rotated, acting through the links 69 to rotate the arm 70 on the shaft 72. Rotation of the shaft 72 produces the same effect as rotating the shaft 39 to operate both the service brake and the safety brake connected thereto, in the manner which has been described.

Figure 3 illustrates the safety brake A in the form which has been described. It may be seen that in this form, the clockwise rotation of the bell crank 49 may continue until a certain predetermined compression of the spring 60 is reached. At this point the further movement of the bell crank 49 in a clockwise direction is obstructed by the screw stop 64. The upper end of the brake band 32, which is connected to the bell crank 49 by the pin 50, then becomes fixed and the tightness of the band 32 about the drum 26 will depend upon the compression of the spring 60.

In Figure 4 is illustrated a similar form of safety brake A. In this form, however, the bolt 57 is extended through the lug 58 a considerable distance and through a fixed cross member 73 on the frame of the hoisting mechanism B. In this form of safety brake A, the movement of the end of the band 32 bearing the lug 58 is limited by the nut 74 on the bolt 57. As may be seen in this modification, the opposite end of the brake band 32 becomes fixed, but it should be noted that in this form of construction, as well as in the construction illustrated in Figure 3, the pressure on the brake band 32 depends upon the compression of the spring 60 within the stirrup 56. In practical application, the only difference between the forms illustrated in Figures 3 and 4, is the convenience with which the cross members 65 or 73 may be placed in a particular position. It is also sometimes found that the safety brake has a tendency to chatter more, when the fixed end of the band 32, when the brake is operating under an excessively heavy load, is situated at the end connected by the pin 50 to the bell crank 49.

A slightly different form of construction embodying the applicants' principles of invention is illustrated in Figure 5 of the drawings. In this form of construction, the arm 48' does not connect the connecting arm 47 with the shaft of the bell crank 49'. The arm 48' pivots at 75. One end of the brake band 32' is connected to the arm 48' by the pin 76. The bell crank 49' is pivoted at 77 and one arm 78 of the bell crank 49' extends in parallel relationship to the arm 48'. An eye bolt member 79 is pivoted at 80 to the arm 78 and extends slidably through a bearing 82 on the arm 48'. A compression spring 60' is interposed between the bearing 82 and a nut 83 on the eye bolt 79. This spring 60' is compressed to the maximum load for which the hoisting mechanism B is designed.

The arm 84 of the bell crank 49' is somewhat longer than the arm 78 and is connected by means of the pin 85 to the lower end of the brake band 32'. A screw stop 64' extends through a cross member 65' to limit the pivoting of the bell crank 49' in a clockwise direction.

When a greater load than that for which the hoisting mechanism is designed, is exerted upon the cable spool, the spring 60' compresses until the arm 84 of the bell crank 49' strikes the stop 64'. The lower end of the brake band 32' connected by the pin 85 then becomes fixed and the tension of the brake band 32' depends upon the compression of the spring 60'. It may thus be seen that the form of brake shown in this modification, acts in identically the same manner as the form of brake illustrated in Figure 4.

We have described our safety brake in connection with a hoisting mechanism. We wish to have it understood, however, that the application of this brake to a hoisting mechanism is only illustrative of one means of carrying out our invention. The resilient cushioning means shown in this application may be applied to any mechanism, wherein a differential brake is used. While we are aware of the fact that safety brakes have been provided heretofore, it is usually found that these brakes act virtually instantaneously. Brakes of this type would be unsuitable for use in connection with mechanisms such as hoisting machinery, wherein the instantaneous stopping of a descending load would place a great strain upon the cable and upon the parts of the hoisting machinery.

In accordance with the patent statutes, we have described the principles of operation of our safety brake, and while we have endeavored to set forth the best embodiment thereof, we desire to have it understood that this is only illustrative of a means of carrying out our invention that obvious changes may be made within the scope of the following claims without departing from the spirit of the invention.

We claim:

1. A safety brake for hoisting drum means including, brake means for braking said drum means, lever means for operating said braking means, safety brake means automatically operated upon the release of said lever means toward normal position, and means for cushioning the engagement of said safety brake means to overcome shock in braking said drum.

2. A brake for cable spools adapted to control the rotation of the spool upon which the cable is wound and unwound, a brake for stopping said cable spool, a lever for operating said brake, a safety brake means, and means for causing said safety brake means to automatically and cushionally engage to stop the spool when said lever is released to normal position.

3. A brake for cable spools and the like including, means operable by force exerted upon a lever to stop the spool, and means to cushionally stop the spool automatically upon release of the force exerted upon said lever and said first means.

4. The combination, spool means for winding and unwinding a load supporting cable, brake means for stopping said spool means, lever means for operating said brake means, a safety brake means operable automatically by the release of said lever means, means for adjusting said safety brake to slip under greater than maximum strain, and means for releasing said safety brake means simultaneously with the operation of said lever into position to operate said first brake means.

5. The combination, a cable spool for operating a load supporting cable, a service brake for controlling said spool, a safety brake for emergency operation, means for adjusting said safety brake to slip under greater than maximum strain, means for operating said service brake simultaneously with the release of said safety brake and said safety brake with the release of said service brake.

6. The combination, a rotatable brake drum, a service brake for controlling the rotation of said brake drum, a lever for operating said brake, a safety brake operated simultaneously by said lever at the releasing of said service brake by said lever, cushioning braking means on said safety brake, said safety brake overcoming sudden shock in the application thereof.

7. The combination, a cable spool, means for operating said spool to wind and unwind a load cable thereon, safety brake means for automatically braking said spool, and resilient cushioning means capable of withstanding maximum load without operation for overcoming sudden shock to the cable in the operation of said safety brake into braking position.

8. The combination, a service brake, a rotatable member controlled by said brake, a lever for operating said service brake, a safety brake for said rotatable member, cushioning means in said safety brake to overcome sudden shock in the braking application thereof, and means connecting said lever in a manner to cause said safety brake to be automatically applied upon the release of said service brake and said safety brake to be released upon the application of said service brake.

9. A brake for hoisting mechanism including, a service brake, lever means for controlling said service brake, a safety brake, a cushion in said safety brake, differential lever means in said safety brake, and means connecting said service brake and said safety brake in a manner to cause said brakes to be operated by said single operating lever to automatically release said service brake when said safety brake is applied and to automatically release said safety brake when said service brake is applied.

10. A brake for hoisting mechanism including, a service brake, a safety brake, cushioning means in said brakes, to overcome sudden shock or grabbing when said brakes are applied, and a single operating control lever for operating said brakes whereby said service brake is operated by the depression of said lever by the operator against tension, and said safety brake is applied automatically by the release of said lever toward normal position.

11. The combination, a rotatable brake drum, safety brake means for automatically braking said drum, and cushioning means capable of withstanding a maximum load in normal brake operation without being actuated for overcoming sudden shock in the operation of said safety brake into braking position.

JOHN R. McGIFFERT.
OLA L. BERBY.